United States Patent
Tsuda

(10) Patent No.: US 12,525,802 B2
(45) Date of Patent: Jan. 13, 2026

(54) DEMAND ADJUSTMENT CONTROL SYSTEM, DEMAND ADJUSTMENT CONTROL METHOD, AND RECORDING MEDIUM

(71) Applicant: Panasonic Intellectual Property Management Co., Ltd., Osaka (JP)

(72) Inventor: Saya Tsuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 489 days.

(21) Appl. No.: 18/018,443

(22) PCT Filed: Dec. 21, 2021

(86) PCT No.: PCT/JP2021/047444
§ 371 (c)(1),
(2) Date: Jan. 27, 2023

(87) PCT Pub. No.: WO2022/153803
PCT Pub. Date: Jul. 21, 2022

(65) Prior Publication Data
US 2023/0231381 A1   Jul. 20, 2023

(30) Foreign Application Priority Data
Jan. 15, 2021   (JP) .................................. 2021-005013

(51) Int. Cl.
*G05B 19/042* (2006.01)
*H02J 3/14* (2006.01)

(52) U.S. Cl.
CPC .............. *H02J 3/14* (2013.01); *G05B 19/042* (2013.01); *G05B 2219/2639* (2013.01)

(58) Field of Classification Search
CPC ........ G06Q 50/06; G06Q 10/06; G06Q 10/00; G05B 15/02; G05B 2219/2639;
(Continued)

(56) References Cited

U.S. PATENT DOCUMENTS 9,171,256 B2 * 10/2015 Mohagheghi ........... H02J 3/003
2009/0187499 A1 * 7/2009 Mulder .................. G06Q 10/00
705/30

(Continued)

FOREIGN PATENT DOCUMENTS

JP   2013-003732 A   1/2013
JP   2016-123189 A   7/2016

OTHER PUBLICATIONS

International Search Report issued on Mar. 1, 2022 in International Patent Application No. PCT/JP2021/047444, with English translation.

*Primary Examiner* — Darrin D Dunn
(74) *Attorney, Agent, or Firm* — Rimon P.C.

(57) ABSTRACT

A demand adjustment control system includes an obtainer, a determiner, and a controller. The obtainer obtains a target adjustment amount according to a temporary demand adjustment request. The determiner determines one or more target devices each of which is to be a target of demand adjustment control from a device group in a facility, based on the target adjustment amount obtained by the obtainer. The controller executes the demand adjustment control on the one or more target devices to cause an adjustment amount achieved by the one or more target devices to fall within a range of the target adjustment amount during a period in which demand adjustment is being requested. The device group includes one or more first devices of which demand adjustment control mode is not changed during the period and one or
(Continued)

more second devices of which demand adjustment control mode can be changed during the period.

8 Claims, 8 Drawing Sheets

(58) Field of Classification Search
CPC .. G05B 2219/2642; G05B 2219/24024; Y02E 60/00
See application file for complete search history.

(56) References Cited

U.S. PATENT DOCUMENTS

| | | | |
|---|---|---|---|
| 2012/0324260 A1 | 12/2012 | Kezuka et al. | |
| 2014/0277795 A1* | 9/2014 | Matsuoka | H04L 63/08 |
| | | | 700/291 |
| 2015/0094968 A1* | 4/2015 | Jia | G05B 15/02 |
| | | | 702/60 |
| 2016/0086199 A1* | 3/2016 | Edmonds | G06Q 50/06 |
| | | | 705/7.31 |

* cited by examiner

DEMAND ADJUSTMENT CONTROL SYSTEM, DEMAND ADJUSTMENT CONTROL METHOD, AND RECORDING MEDIUM

CROSS-REFERENCE OF RELATED APPLICATIONS

This application is the U.S. National Phase under 35 U.S.C. § 371 of International Patent Application No. PCT/JP2021/047444, filed on Dec. 21, 2021, which in turn claims the benefit of Japanese Patent Application No. 2021-005013, filed on Jan. 15, 2021, the entire disclosures of which applications are incorporated by reference herein.

TECHNICAL FIELD

The present disclosure relates to a demand adjustment control system, a demand adjustment control method, and a recording medium that control a device to adjust power demand in response to a demand adjustment request.

BACKGROUND ART

Patent Literature (PTL) 1 discloses an electronic apparatus for power saving control. The electronic apparatus includes a transceiver, a data analysis block, a display control block, a power-save start line control block, and a command signal output block. The transceiver acquires actual consumption data and predicted consumption data for each time slot, from a power supply management system. The data analysis block analyzes changes of the actual consumption data and of the predicted consumption data and generates graph data representing a graph showing a result of the analysis. The display control block causes a display device to display the graph and a power-save start line in the graph.

The power-save start line control block moves the power-save start line to a desired position and to utilize a value associated with the desired position as a value at which to start power saving. Furthermore, the command signal output block outputs a power-save command signal to an apparatus which should save power, if the actual consumption data and/or the predicted consumption data exceeds the value indicated by the power-save start line.

CITATION LIST

Patent Literature

[PTL 1] Japanese Unexamined Patent Application Publication No. 2013-003732

SUMMARY OF INVENTION

Technical Problem

The present disclosure provides a demand adjustment control system and so on that can easily reduce the influence on a facility during a period in which demand adjustment is being requested by a demand adjustment request.

Solution to Problem

A demand adjustment control system according to an aspect of the present disclosure includes an obtainer, a determinator, and a controller. The obtainer obtains a target adjustment amount according to a temporary demand adjustment request. The determiner determines one or more target devices each of which is to be a target of demand adjustment control from a device group that is provided in a facility, based on the target adjustment amount obtained by the obtainer. The controller executes the demand adjustment control on the one or more target devices to cause an adjustment amount achieved by the one or more target devices to fall within a range of the target adjustment amount during a period in which demand adjustment is being requested by the temporary demand adjustment request. The device group includes one or more first devices of which demand adjustment control mode is not changed during the period and one or more second devices of which demand adjustment control mode can be changed during the period.

A demand adjustment control method according to an aspect of the present disclosure includes obtaining, determining, and controlling. In the obtaining, a target adjustment amount according to a temporary demand adjustment request is obtained. In the determining, one or more target devices each of which is to be a target of demand adjustment control are determined from a device group that is provided in a facility, based on the target adjustment amount obtained in the obtaining. In the controlling, the demand adjustment control is executed on the one or more target devices to cause an adjustment amount achieved by the one or more target devices to fall within a range of the target adjustment amount during a period in which demand adjustment is being requested by the temporary demand adjustment request. The device group includes one or more first devices of which demand adjustment control mode is not changed during the period and one or more second devices of which demand adjustment control mode can be changed during the period.

A recording medium according to an aspect of the present disclosure is a non-transitory computer-readable recording medium that has recorded thereon a program for causing a processor to execute the demand adjustment control method.

Advantageous Effects of Invention

A demand adjustment control system and so on according to the present disclosure have the advantageous effect that the influence on a facility during a period in which demand adjustment is being requested by a demand adjustment request can be easily reduced.

Figure 1:
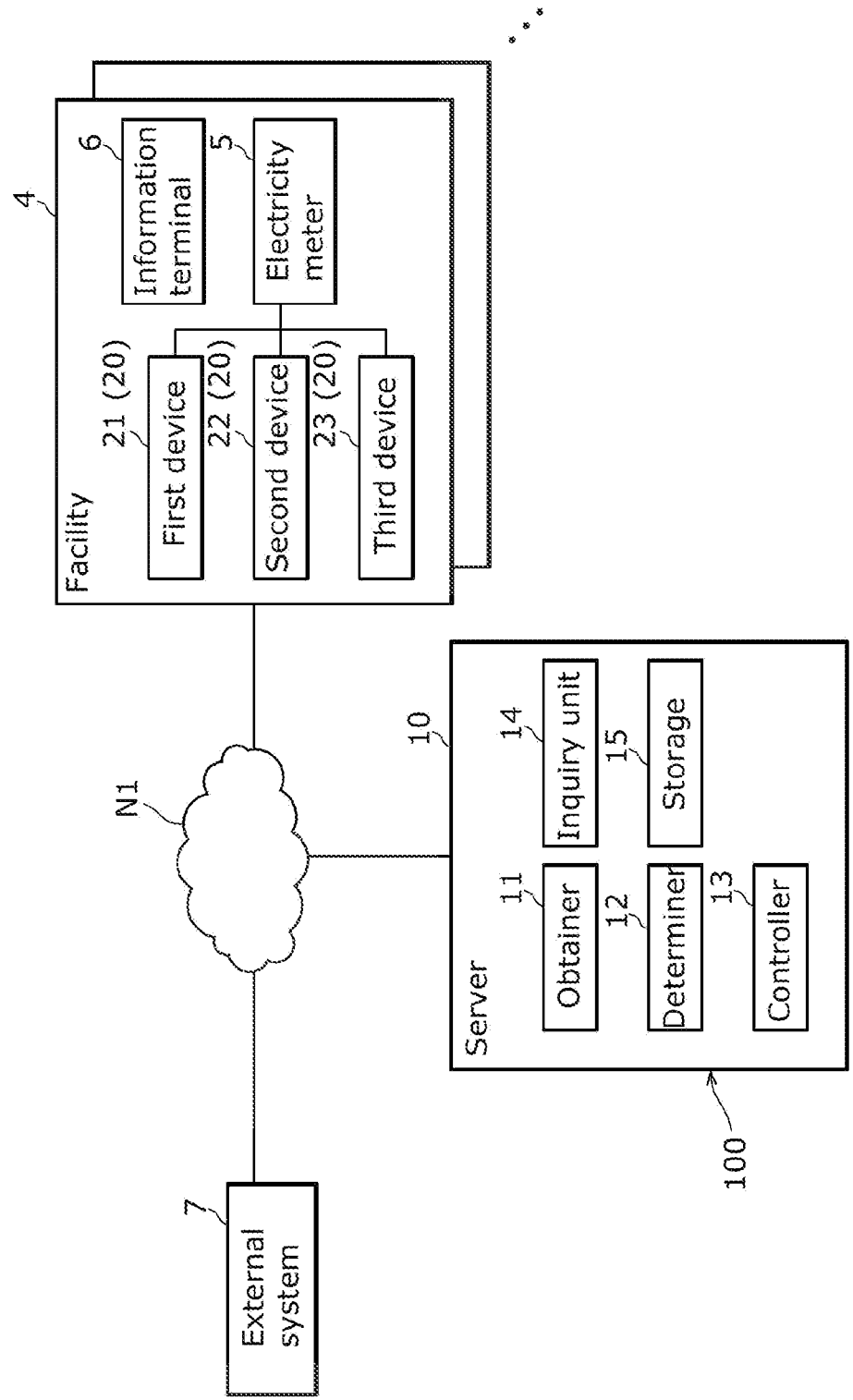
FIG. 1 is a block diagram illustrating the overall configuration including a demand adjustment control system according to Embodiment 1.

DESCRIPTION OF EMBODIMENTS (Underlying Knowledge Forming Basis of the Present Disclosure)

First, the viewpoint of the inventor will be described below.

Conventionally, in response to a power saving request such as a demand response (DR) from an electric power company for example, power saving control according to the power saving request is executed by stopping the operation of a power saving target device or changing the operation mode of the power saving target device.

In recent years, in a virtual power plant (VPP) for example, it is not enough to execute power saving control on a power saving target device simply in response to a power saving request, and it is desirable to execute power saving control on a power saving target device to cause a power saving amount achieved by the power saving target device to fall within a range of an adjustment amount that is commanded by a power saving request. Moreover, in a VPP and so on, it is fundamentally required to make a power supply amount and a power consumption amount simultaneously equal to each other, that is, to constantly balance power demand and power supply, in order to achieve a constant frequency of and a constant voltage of power that is supplied by an electric power company or the like. Accordingly, not only a power saving request but also a power consuming request for causing excessively generated power to be consumed may occasionally be issued. Therefore, it is also desirable to execute power consuming control on a power consuming target device to cause a power consumption amount achieved by the power consuming target device to fall within a range of a power consumption amount that is commanded by a power consuming request. In short, it is desirable to execute demand adjustment control on a demand adjustment target device in response to a demand adjustment request such as a power saving request or a power consuming request.

However, in a conventional way, when a demand adjustment request is a power saving request, for example, and once power saving control is executed on a power saving target device in response to the power saving request, the power saving control continues until power saving is not requested anymore. Therefore, in a conventional way, there is the problem that it is difficult to flexibly control a demand adjustment target device (power saving target device) to cause an adjustment amount (power saving amount) achieved by the demand adjustment target device to fall within an adjustment amount (power saving amount) that is commanded by a demand adjustment request (power saving request) as described above.

Moreover, even if a demand adjustment target device (power saving target device) can be flexibly controlled as described above, the following problem may further arise. When the operation of a demand adjustment target device (power saving target device) is repeatedly changed to cause an adjustment amount (power saving amount) achieved by the demand adjustment target device to fall within an adjustment amount (power saving amount) that is commanded by a demand adjustment request (power saving request), such a repetition of operation change may influence a facility in which the demand adjustment target device is provided.

For example, the facility is assumed to be a store such as a convenience store, and the power saving target device is assumed to be a lighting fixture that is installed in a sales floor of the store. In such a case, when the dimming rate of the lighting fixture is repeatedly changed in response to a power saving request for example, customers may feel uncomfortable by visually sensing the change of the lighting environment in the store.

The present disclosure is conceived in view of the above.

Hereinafter, embodiments will be described in detail with reference to the Drawings. However, there are instances where excessively detailed description is omitted. For example, detailed description of well known matter or repeated description of essentially similar elements may be omitted. This is to make the following description easier for those skilled in the art to understand and avoid redundancy.

Hereinafter, a predetermined value (e.g., the total value of an adjustment amount to be described later) and a threshold value (e.g., a target adjustment amount to be described later) are compared to each other. In such a comparison, a threshold value may be included in one of branch conditions or in another of the branch conditions. For example, the one of the branch conditions may be "a predetermined value is greater than or equal to (or less than or equal to) a threshold value" or "a predetermined value is greater than (or less than) a threshold value".

It should be noted that the inventor provides the accompanying drawings and the following description not to limit the scope of the claims, but to aid those skilled in the art to adequately understand the present disclosure.

Embodiment 1

1-1. Overall Configuration

First, the overall configuration including demand adjustment control system 100 according to Embodiment 1 will be described with reference to FIG. 1. FIG. 1 is a block diagram illustrating the overall configuration including demand adjustment control system 100 according to Embodiment 1. Demand adjustment control system 100 determines one or more target devices 3 each of which is to be a target of demand adjustment control from device group 2 in response to a demand adjustment request from external system 7 that is operated by, for example, an electric power company or an aggregator, and executes the demand adjustment control on one or more target devices 3. It should be noted that the demand adjustment control on one or more target devices 3 may include purposely not controlling one or more target devices 3 when the demand adjustment request indicates that demand adjustment control is unnecessary. For example, there may be a case where the number of target devices 3, on which demand adjustment control is executed, is zero depending on a demand adjustment request, and such a case is also included in the demand adjustment control on target device 3.

The demand adjustment request is not a permanent request but a temporary request such as a DR as described above, for example. Furthermore, other than a DR as described above, examples of the demand adjustment request may include a request for peak shaving for suppressing power consumption during a peak time of power demand. Furthermore, examples of the demand adjustment request may include a request for suppressing power consumption during a time when an electricity rate is relatively high based on an electricity rate in the electricity balancing market.

Device group 2 includes device 20 that is provided in facility 4 and may become a target of demand adjustment control. For example, when there is single facility 4, device group 2 includes device 20 that is provided in facility 4. For example, when there are facilities 4, device group 2 includes all devices 20 that are provided in facilities 4.

Examples of facility 4 include a store such as a convenience store or a supermarket. It should be noted that facility 4 is not limited to a store and examples of facility 4 may include a residential facility such as a detached house or an apartment house, or a non-residential facility such as an office, a school, a welfare facility, a hospital, or a factory. In Embodiment 1, facility 4 is assumed to be a convenience store unless otherwise specified.

Figure 2:
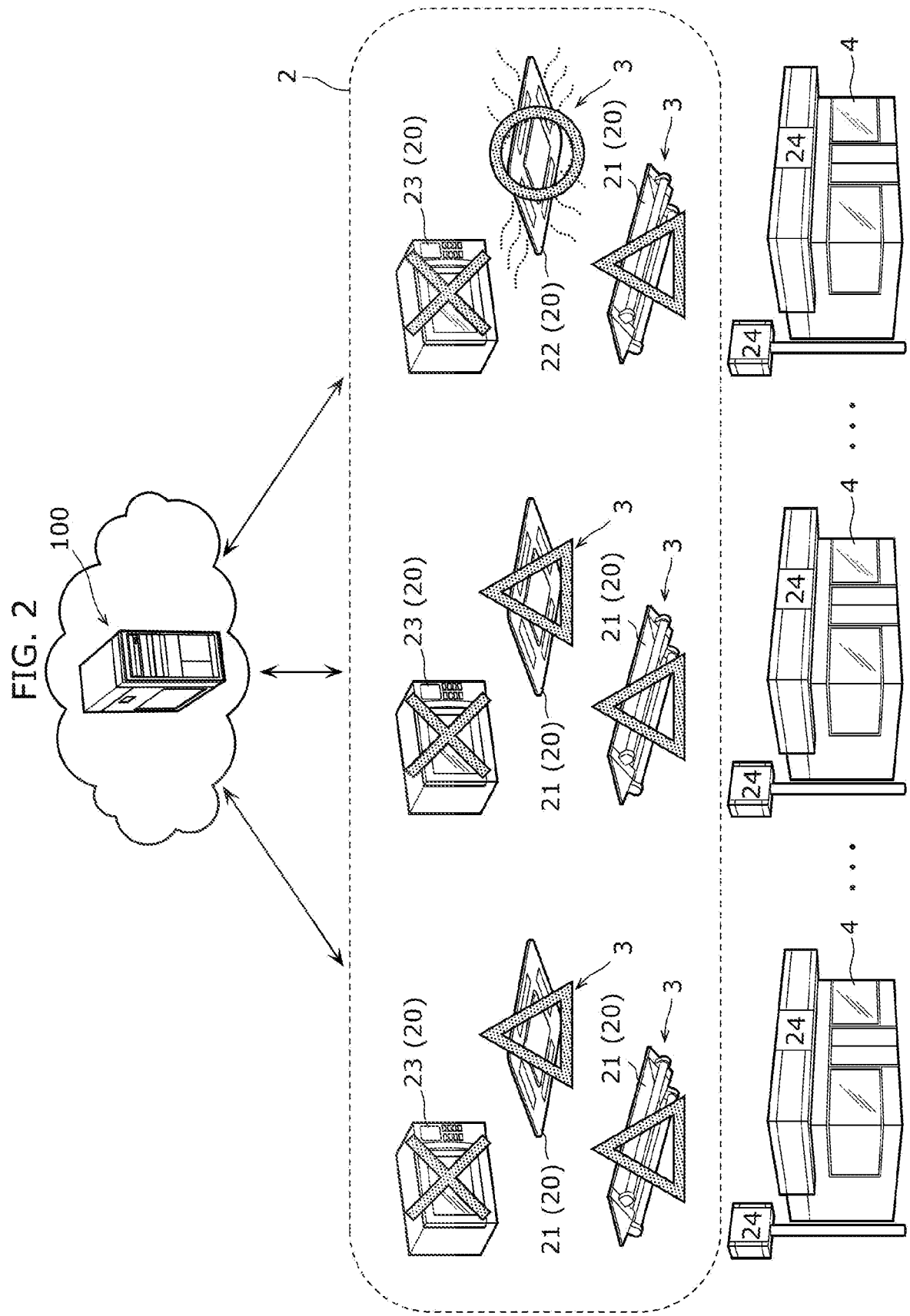
FIG. 2 is a schematic diagram illustrating an example of demand adjustment control by the demand adjustment control system according to Embodiment 1.

In Embodiment 1, as illustrated in FIG. 2, it is assumed that there are facilities 4 that are targets of control by demand adjustment control system 100. FIG. 2 is a schematic diagram illustrating an example of demand adjustment control by demand adjustment control system 100 according to Embodiment 1. In the example illustrated in FIG. 2, devices 20 are provided in each of facilities 4. In the example illustrated in FIG. 2, device group 2 includes first device 21 (device 20 with a triangle mark in the drawing), second device 22 (device 20 with a circle mark in the drawing), and third device 23 (device 20 with a cross mark in the drawing). Although the detail will be described later, among devices 20 in device group 2, first device 21 and second device 22 may be selected as target devices 3. On the other hand, among devices 20 in device group 2, third device 23 cannot be selected as target device 3. In the example illustrated in FIG. 2, all of first devices 21 and second devices 22 in facilities 4 are selected as target devices 3.

1-2. Demand Adjustment Control System

Next, demand adjustment control system 100 will be described in detail. As illustrated in FIG. 1, demand adjustment control system 100 includes obtainer 11, determiner 12, controller 13, inquiry unit 14, and storage 15. It should be noted that, in Embodiment 1, it is sufficient that demand adjustment control system 100 include at least obtainer 11, determiner 12, and controller 13, and demand adjustment control system 100 needs not to include other constituent elements. For example, the other constituent elements can be implemented by a system or the like other than demand adjustment control system 100.

In Embodiment 1, demand adjustment control system 100 is implemented by server 10. For example, server 10 can communicate with each facility 4 via network N1 such as the Internet. Moreover, server 10 can communicate with external system 7 via network N1. Communication between server 10 and each facility 4 and communication between server 10 and external system 7 are, for example, wireless communication and networking standards for the communication are not particularly limited. It should be noted that the communication between server 10 and each facility 4 and the communication between server 10 and external system 7 may be wired communication.

Server 10 includes a processor and memory and implements various functions by the processor executing a computer program stored in the memory. In Embodiment 1, the memory is storage 15.

Obtainer 11 obtains a target adjustment amount according to a temporary demand adjustment request. Here, the target adjustment amount means a target value of the total value of an amount of power to be saved or consumed for demand adjustment during a period in which demand adjustment is being requested. In Embodiment 1, obtainer 11 obtains a target adjustment amount by receiving, as the target adjustment amount, a command value of an adjustment amount together with a demand adjustment request from external system 7. The number of devices 20 that are possible to participate in demand adjustment control is obtained by receiving, from each facility 4, a reply to an inquiry made by inquiry unit 14, which is to be described later.

It should be noted that, in the present embodiment, the description is carried out under the assumption that an adjustment amount for power saving becomes a positive value and an adjustment amount for power consuming becomes a negative value. In other words, when the target adjustment amount is a positive value, the demand adjustment request corresponds to a power saving request; on the other hand, when the target adjustment amount is a negative value, the demand adjustment request corresponds to a power consuming request.

Determiner 12 determines one or more target devices 3 each of which is to be a target of the demand adjustment control from device group 2 that is provided in facility 4, based on the target adjustment amount obtained by obtainer 11. In Embodiment 1, determiner 12 determines one or more target devices 3 according to the reply to the inquiry made by inquiry unit 14. As described above, the reply includes information regarding devices 20 that are possible to participate in the demand adjustment control. Accordingly, determiner 12 determines one or more target devices 3 from among devices 20 that are possible to participate in the demand adjustment control.

Device group 2 includes one or more first devices 21 and one or more second devices 22. In Embodiment 1, one or more first devices 21 and one or more second devices 22 are assumed to be provided in each facility 4. It should be noted that, when there are facilities 4, facilities 4 may include facility 4 in which first device 21 is not provided and facility 4 in which second device 22 is not provided.

When first device 21 or second device 22 is a lighting fixture, power saving control (demand adjustment control) such as decreasing the brightness of the lighting fixture or power consuming control (demand adjustment control) such as increasing the brightness of the lighting fixture may be executed. Moreover, when first device 21 or second device 22 is an air-conditioning apparatus such as an air-conditioner, power saving control (demand adjustment control) such as increasing the set temperature in a cooling operation, decreasing the set temperature in a heating operation, decreasing the airflow rate, switching from a dehumidifying operation to a cooling operation, or switching off the air-conditioner may be executed. Alternatively, power consuming control (demand adjustment control) such as decreasing the set temperature in a cooling operation, increasing the set temperature in a heating operation, increasing the airflow rate, switching from a cooling operation to a dehumidifying operation, or switching on the air-conditioner may be executed. Moreover, when first device 21 or second device 22 is refrigeration equipment such as a refrigerator or a freezer, power saving control (demand adjustment control) such as increasing the inside temperature of the refrigeration equipment or power consuming control (demand adjustment control) such as decreasing the inside temperature of the refrigeration equipment may be executed.

First device 21 is a device of which demand adjustment control mode is not changed during the period in which demand adjustment is being requested. For example, first device 21 is assumed to be a lighting fixture and power saving control (demand adjustment control) of decreasing the brightness of the lighting fixture is assumed to be executed. In this case, during the period in which power saving (demand adjustment) is being requested, once the brightness of the lighting fixture is decreased, control of increasing the brightness of the lighting fixture to the previous brightness is not executed on the lighting fixture. First device 21 is a device that may influence a user of facility 4 by changing its demand adjustment control mode during the period in which demand adjustment is being requested. For example, the lighting fixture may visually influence a user of facility 4 by repeatedly changing the dimming rate of the lighting fixture to change the lighting environment in facility 4 during the period in which demand adjustment is being requested.

Second device 22 is a device of which demand adjustment control mode can be changed during the period in which demand adjustment is being requested. For example, second device 22 is assumed to be an air-conditioning apparatus, and power saving control (demand adjustment control) of decreasing the airflow rate is assumed to be executed. In this case, control of increasing the airflow rate to the previous airflow rate may be executed on the air-conditioning apparatus during the period in which power saving (demand adjustment) is being requested. Second device 22 is a device that has a relatively small influence on a user of facility 4 even when its demand adjustment control mode is changed during the period in which demand adjustment is being requested. For example, even when control of changing the airflow rate is repeatedly executed on the air-conditioning apparatus during the period in which demand adjustment is being requested and thereby causing a temperature change in facility 4, such a temperature change is hardly perceived by a user of facility 4. Therefore, the air-conditioning apparatus scarcely influences a user of facility 4.

Moreover, for example, second device 22 is assumed to be refrigeration equipment such as a refrigerator or a freezer, and power saving control (demand adjustment control) of increasing the inside temperature of the refrigeration equipment is assumed to be executed. In this case, control of decreasing the inside temperature to the previous inside temperature may be executed on the refrigeration equipment during the period in which power saving (demand adjustment) is being requested. Even when control of changing the inside temperature is repeatedly executed on the refrigeration equipment during the period in which demand adjustment is being requested, such a change in the inside temperature is hardly perceived by a user of facility 4. Therefore, the refrigeration equipment scarcely influences a user of facility 4.

Hereinafter, specific examples of first device 21 and second device 22 will be described. For example, when facility 4 is a store that sells food, such as a convenience store, examples of first device 21 may include a lighting fixture installed in an office room or a sales floor, and an exhaust fan installed in a kitchen. Moreover, when facility 4 is an office, examples of first device 21 may include a lighting fixture and exhaust equipment.

For example, when facility 4 is a store that sells food, such as a convenience store, examples of second device 22 may include a power storage device, an air-conditioning apparatus installed in an office room or a sales floor, a beverage warmer, a fryer, a refrigerator, and a freezer. Moreover, when facility 4 is an office, examples of second device 22 may include an air-conditioning apparatus.

It should be noted that device group 2 may include another device in addition to first device 21 and second device 22. In other words, device group 2 may include third device 23 that is not to be a target of the demand adjustment control. Third device 23 is a device that may influence a user of facility 4 simply because of the demand adjustment control during the period in which demand adjustment is being requested. For example, when facility 4 is a store that sells food, such as a convenience store, examples of third device 23 may include a warmer for cooked food (e.g., Oden, which is a kind of Japanese hotchpotch), a coffee maker, and a microwave. In other words, if the demand adjustment control is executed on third device 23, third device 23 becomes unavailable for a user of facility 4 and thus may significantly influence the operation in facility 4. Therefore, third device 23 is not selected as a target of the demand adjustment control.

In Embodiment 1, determiner 12 determines which of one or more second devices 22 are to be selected as one or more target devices 3, based on a record of the past demand adjustment control. Specifically, determiner 12 prioritizes second devices 22 that are possible to participate in the demand adjustment control, based on the record of the past demand adjustment control. For example, determiner 12 gives a higher priority to second device 22 that is expected to achieve a larger adjustment amount during the period in which demand adjustment is being requested. For another example, determiner 12 gives a higher priority to second device 22 that has more frequently participated in the past demand adjustment control. Then, determiner 12 selects second devices 22 as target devices 3 in order of priority.

Determiner 12 needs not to select, as target devices 3, all of second devices 22 that are possible to participate in the demand adjustment control. If a power saving amount (adjustment amount) achieved by target devices 3 is not adequate for the command value of a power saving amount (adjustment amount) at the middle of the period in which demand adjustment is being requested, determiner 12 may further determine which of one or more second devices 22 are to be selected as one or more target devices 3, in addition to second devices 22 initially selected as target devices 3. As an example, when a power saving amount (adjustment amount) achieved by target devices 3 is not adequate for the command value of a power saving amount (adjustment amount) at the middle of the period in which demand adjustment is being requested, determiner 12 may further determine which of one or more second devices 22 in different facility 4 are to be selected as one or more target devices 3. In this case, different facility 4 is facility 4 that is other than facility 4 including second devices 22 initially selected as target devices 3, and is possible to participate in the demand adjustment control.

It should be noted that determiner 12 may determine which of one or more second devices 22 are to be selected as one or more target devices 3 according to an input operation by a manager or the like of demand adjustment control system 100, for example.

Controller 13 executes the demand adjustment control on one or more target devices 3 to cause an adjustment amount achieved by one or more target devices 3 to fall within a range of the target adjustment amount during the period in which demand adjustment is being requested. In Embodiment 1, controller 13 controls target devices 3 by transmitting a control signal including a command of demand adjustment control to each of target devices 3. When receiving the control signal, each of target devices 3 is controlled according to the command of demand adjustment control included in the control signal.

Specifically, controller 13 transmits a control signal to each of target devices 3 when the period in which demand adjustment is being requested starts. Moreover, when the adjustment amount achieved by target devices 3 seems unlikely to fall within a range of the target adjustment amount during the period in which demand adjustment is being requested, controller 13 further transmits a control signal to each of second devices 22 among target devices 3. The control signal transmitted to each of second devices 22 includes a command to change a demand adjustment control mode.

In Embodiment 1, controller 13 obtains power information periodically transmitted from electricity meter 5 such as a smart meter provided in each facility 4, and compares the total value of an adjustment amount achieved by target devices 3 with the target adjustment amount, based on the obtained power information. The power information is, for example, an amount of power consumed at each facility 4. Controller 13 calculates the adjustment amount based on the power information from each facility 4. Then, for example, when the total value of the adjustment amount achieved by target devices 3 seems likely to exceed the target adjustment amount, controller 13 may stop the operation of second devices 22 on which the demand adjustment control has been executed or may cancel the demand adjustment control of second devices 22, depending on the difference between the total value of the adjustment amount achieved by target devices 3 and the target adjustment amount. It should be noted that, "the total value of an adjustment amount exceeds a target adjustment amount" means the total value becomes greater than a target adjustment amount when the target adjustment amount is a positive value (i.e., power saving amount), and also means the total value becomes less than a target adjustment amount when the target adjustment amount is a negative value (i.e., power consuming amount).

When receiving a control signal at the beginning of the period in which demand adjustment is being requested, first device 21 is controlled according to a command of demand adjustment control included in the control signal. Then, first device 21 does not change its demand adjustment control mode until the period in which demand adjustment is being requested ends.

Moreover, when receiving a control signal at the beginning of the period in which demand adjustment is being requested, second device 22 is controlled according to a command of demand adjustment control included in the control signal. Then, when receiving another control signal during the period in which demand adjustment is being requested, second device 22 changes its demand adjustment control mode according to a command in the another control signal.

It should be noted that, when the demand adjustment request is a power saving request, there may be a case where power saving control being executed on second device 22 is switched to power consuming control during the period in which power saving is being requested. Moreover, when the demand adjustment request is a power consuming request, there may be a case where power consuming control being executed on second device 22 is switched to power saving control during the period in which power consuming is being requested.

Inquiry unit 14 makes an inquiry to facility 4 about whether facility 4 will participate in the demand adjustment control. In Embodiment 1, inquiry unit 14 transmits, to each facility 4, notification of a receipt of the demand adjustment request, and an inquiry signal including a command to request information regarding devices 20 (first devices 21 and second devices 22) that are possible to participate in the demand adjustment control. It should be noted that inquiry unit 14 may limit the number of facilities 4 to which the inquiry signal is transmitted, according to an area in which facilities 4 are located or location conditions of facilities 4, for example. In other words, inquiry unit 14 needs not always transmit the inquiry signal to all facilities 4 but may transmit the inquiry signal to only some of facilities 4.

In each facility 4, information terminal 6, such as a tablet device or a personal computer, receives the inquiry signal. When receiving the inquiry signal, information terminal 6 transmits, to demand adjustment control system 100, a reply signal including information regarding devices 20 that are possible to participate in the demand adjustment control. Here, devices 20 that are possible to participate in the demand adjustment control may be set by a manager or the like of facility 4 operating information terminal 6 when or before information terminal 6 receives the inquiry signal. Moreover, the reply signal may be transmitted according to an operation of the manager or the like of facility 4 or may be transmitted automatically.

It should be noted that, in setting of devices 20 that are possible to participate in the demand adjustment control, a time period during which devices 20 do not participate in the demand adjustment control may be set as desired in the period in which demand adjustment is being requested. For example, the period in which demand adjustment is being requested is assumed to be from 1 p.m. to 2 p.m. In such a case, a time period from 1:30 p.m. to 2 p.m. may be set as the time period during which devices 20 do not participate in the demand adjustment control.

Storage 15 is a storage device in which necessary information (computer program and so on) for the processor of server 10 to execute various controls is stored. Storage 15 is implemented by a semiconductor memory for example; however, storage 15 is not limited to this example but may be implemented by other well-known electronic information storage means. In storage 15, data regarding devices 20 that are possible to participate in the demand adjustment control during the period in which demand adjustment is being requested is stored, for example.

2. Operation

Figure 3:
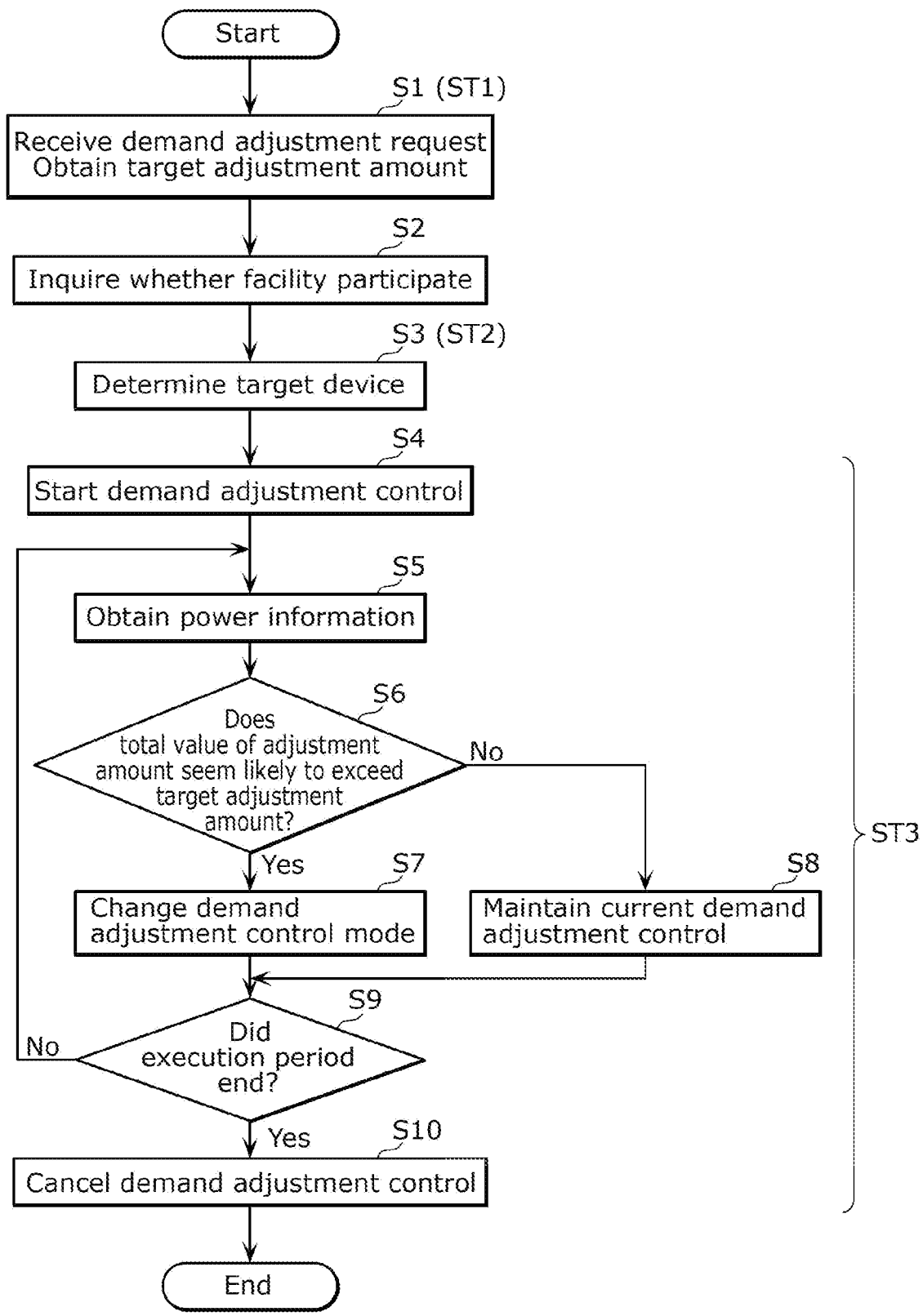
FIG. 3 is a flowchart illustrating an operation example of the demand adjustment control system according to Embodiment 1.

The operation of demand adjustment control system 100 configured as described above will be described below with reference to FIG. 3. FIG. 3 is a flowchart illustrating an operation example of demand adjustment control system 100 according to Embodiment 1. Hereinafter, demand adjustment control system 100 is assumed to receive a DR as a demand adjustment request from external system 7. Of course, the operation which is to be described below will be performed also when a demand adjustment request other than a DR is received from external system 7. Moreover, hereinafter, one or more first devices 21 and one or more second devices 22 are assumed to be selected as target devices 3 by determiner 12.

First, obtainer 11 receives a demand adjustment request from external system 7 (S1). At that time, obtainer 11 also receives a command value of an adjustment amount (i.e., target adjustment amount) together with the demand adjustment request. Process S1 corresponds to obtaining ST1 of a demand adjustment control method.

After obtainer 11 receives the demand adjustment request, inquiry unit 14 transmits an inquiry signal to each facility 4 to make an inquiry about whether each facility 4 will participate in a demand adjustment control (S2). It should be noted that process S2 may be omitted when inquiry unit 14 has received a reply to the inquiry from each facility 4 beforehand in a predetermined period (e.g., one day) prior to the receipt of the demand adjustment request, for example.

Subsequently, determiner 12 determines target devices 3 from among devices 20 that are possible to participate in the demand adjustment control, based on the target adjustment amount obtained by obtainer 11 (S3). In process S3, determiner 12 selects one or more second devices 22 as one or more target devices 3 in order of priority as described above. Process S3 corresponds to determining ST2 of the demand adjustment control method.

Next, controller 13 transmits a control signal to each of target devices 3 when a period in which demand adjustment is being requested starts, thereby starting the demand adjustment control of target devices 3 (S4). Then, controller 13 periodically obtains power information from electricity meter 5 that is provided in each facility 4 (S5), and compares the total value of an adjustment amount achieved by target devices 3 with the target adjustment amount, based on the power information obtained (S6).

When the total value of the adjustment amount achieved by target devices 3 seems likely to exceed the target adjustment amount (S6: Yes), controller 13 changes the demand adjustment control mode of one or more second devices 22 on which the demand adjustment control is executed, depending on the difference between the total value of the adjustment amount achieved by target devices 3 and the target adjustment amount (S7). On the other hand, when the total value of the adjustment amount achieved by target devices 3 seems unlikely to exceed the target adjustment amount (S6: No), controller 13 maintains the current demand adjustment control executed on one or more second devices 22 (S8).

Thereafter, controller 13 repeats the above-described series of processes S5 to S8 until the period in which demand adjustment is being requested ends (S9: No). When the period in which demand adjustment is being requested ends (S9: Yes), controller 13 cancels the demand adjustment control of target devices 3 (S10). Processes S4 to S10 correspond to controlling ST3 of the demand adjustment control method.

Figure 4:
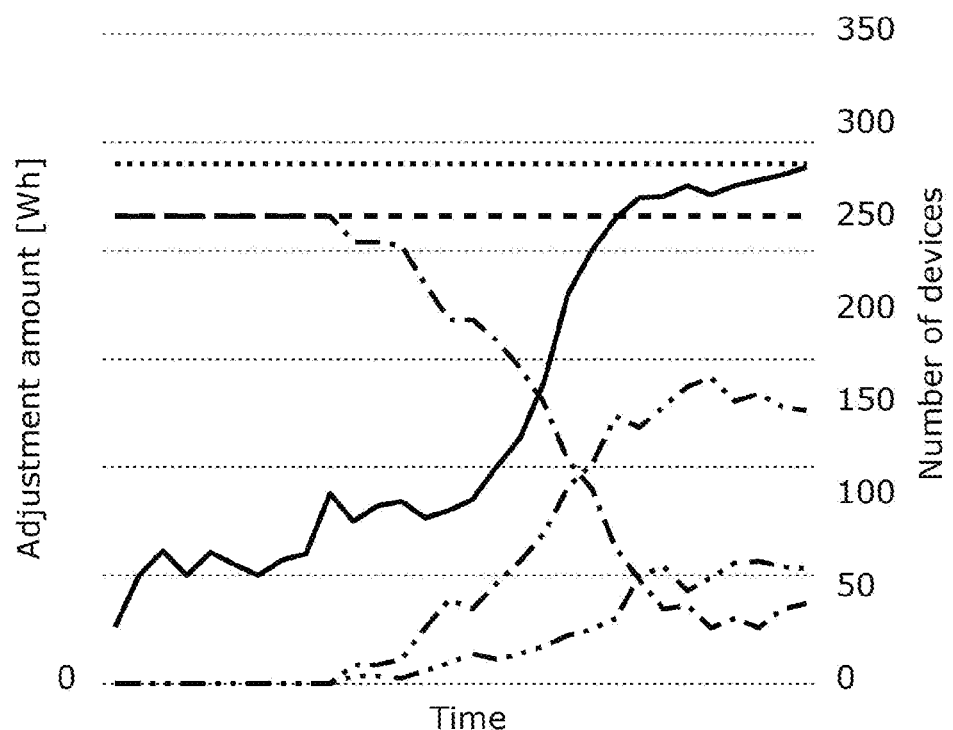
FIG. 4 is a graph illustrating an example of demand adjustment control by the demand adjustment control system according to Embodiment 1 when power demand is excessive.

Hereinafter, an example of demand adjustment control by demand adjustment control system 100 according to Embodiment 1 will be described. FIG. 4 is a graph illustrating an example of demand adjustment control by demand adjustment control system 100 according to Embodiment 1 when power demand is excessive. In FIG. 4, a vertical axis on the left side indicates an adjustment amount per unit time, a vertical axis on the right side indicates the number of devices 20 on which demand adjustment control is executed, and a horizontal axis indicates time. Moreover, in FIG. 4, a solid line represents an adjustment amount per unit time, a broken line represents the number of first devices 21 on which demand adjustment control is executed, and a dotted line represents a target adjustment amount. In the example illustrated in FIG. 4, the target adjustment amount is a positive value, that is, represents a power saving amount since power demand is excessive.

Furthermore, in FIG. 4, a one-dot chain line represents the number of second devices 22 on which power saving control is executed as demand adjustment control, a two-dot chain line represents the number of second devices 22 on which power consuming control is executed as demand adjustment control, and a three-dot chain line represents the number of second devices 22 on which demand adjustment control is not executed.

As illustrated in FIG. 4, not only the number of second devices 22 on which power saving control is executed as demand adjustment control but also the number of second devices 22 on which power consuming control is executed as demand adjustment control may change when power demand is excessive. Moreover, as illustrated in FIG. 4, there may be second devices 22 on which demand adjustment control is not executed, in addition to second devices 22 on which either one of power saving control or power consuming control is executed as demand adjustment control.

Figure 5:
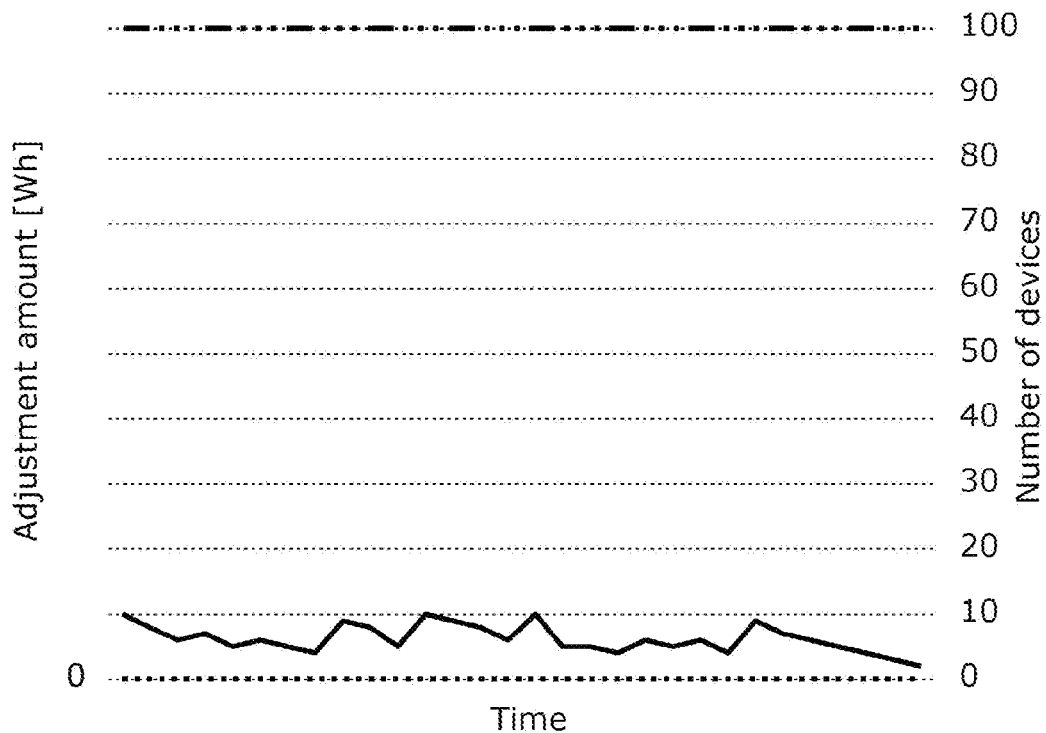
FIG. 5 is a graph illustrating an example of demand adjustment control by the demand adjustment control system according to Embodiment 1 when a fluctuation in power demand is restrained.

FIG. 5 is a graph illustrating an example of demand adjustment control by demand adjustment control system 100 according to Embodiment 1 when a fluctuation in power demand is restrained. A vertical axis on the left side indicates an adjustment amount per unit time, a vertical axis on the right side indicates the number of devices 20 on which demand adjustment control is executed, and a horizontal axis indicates time. Moreover, in FIG. 5, a solid line represents an adjustment amount per unit time, a three-dot chain line represents the number of second devices 22 on which demand adjustment control is not executed, and a dotted line represents a target adjustment amount. In the example illustrated in FIG. 5, the target adjustment amount is zero in order to restrain a fluctuation in power demand, that is, to maintain the current power demand. It should be noted that, in the example illustrated in FIG. 5, demand adjustment control is not executed on all of target devices 3. Therefore, in FIG. 5, the number of first devices 21, the number of second devices 22 on which power saving control is executed as demand adjustment control, and the number of second devices 22 on which power consuming control is executed as demand adjustment control are all zero, and thus not illustrated.

As illustrated in FIG. 5, in a case where an adjustment amount per unit time falls within a range of a target adjustment amount when a fluctuation in power demand is restrained, demand adjustment control is not executed on all of target devices 3 such as first device 21 and second device 22 that are selected as target devices 3.

Figure 6:
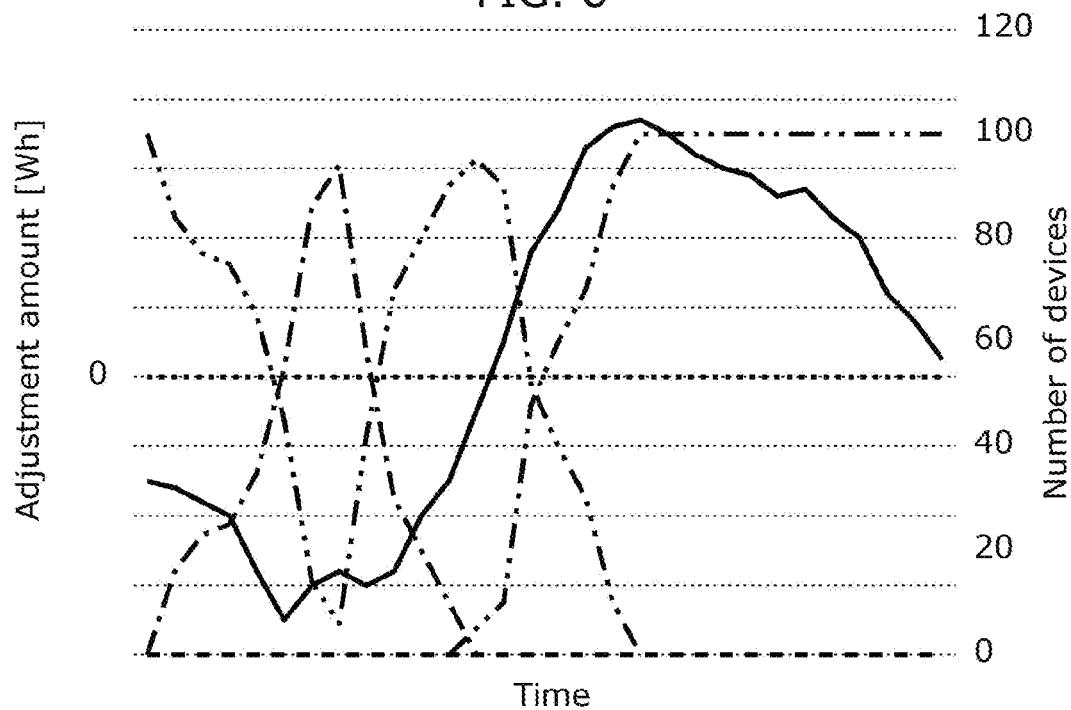
FIG. 6 is a graph illustrating another example of demand adjustment control by the demand adjustment control system according to Embodiment 1 when a fluctuation in power demand is restrained.

FIG. 6 is a graph illustrating another example of demand adjustment control by demand adjustment control system 100 according to Embodiment 1 when a fluctuation in power demand is restrained. In FIG. 6, a vertical axis on the left side indicates an adjustment amount per unit time, a vertical axis on the right side indicates the number of devices 20 on which demand adjustment control is executed, and a horizontal axis indicates time. Moreover, in FIG. 6, a solid line represents an adjustment amount per unit time, a broken line represents the number of first devices 21 on which demand adjustment control is executed, and a dotted line represents a target adjustment amount. In the example illustrated in FIG. 6, the target adjustment amount is zero in order to restrain a fluctuation in power demand, that is, to maintain the current power demand.

Furthermore, in FIG. 6, a one-dot chain line represents the number of second devices 22 on which power saving control is executed as demand adjustment control, a two-dot chain line represents the number of second devices 22 on which power consuming control is executed as demand adjustment control, and a three-dot chain line represents the number of second devices 22 on which demand adjustment control is not executed.

As illustrated in FIG. 6, in a case where an adjustment amount per unit time does not fall within a range of a target adjustment amount when a fluctuation in power demand is restrained, target devices 3 are controlled to cause the adjustment amount per unit time to fall within the range of the target adjustment amount. In the example illustrated in FIG. 6, the number of second devices 22 on which power saving control is executed as demand adjustment control, the number of second devices 22 on which power consuming control is executed as demand adjustment control, and the number of second devices 22 on which demand adjustment control is not executed may change depending on a fluctuation in the adjustment amount per unit time.

3. Advantageous Effect and so on

Hereinafter, advantageous effects of demand adjustment control system 100 according to Embodiment 1 will be described by comparison with a demand adjustment control system according to a comparative example. The demand adjustment control system according to the comparative example differs from demand adjustment control system 100 according to Embodiment 1 in that during a period in which demand adjustment is being requested, the demand adjustment control system according to the comparative example stepwisely increases the number of devices 20 on which demand adjustment control is executed, based on the total value of an adjustment amount. Moreover, the demand adjustment control system according to the comparative example differs from demand adjustment control system 100 according to Embodiment 1 in that during a period in which demand adjustment is being requested, once the demand adjustment control of devices 20 starts, the demand adjustment control system according to the comparative example cannot cancel the demand adjustment control of devices 20 until the period in which demand adjustment is being requested ends. In other words, it can be said that the demand adjustment control system according to the comparative example differs from demand adjustment control system 100 according to Embodiment 1 in that the demand adjustment control system according to the comparative example executes demand adjustment control only on first device 21 during a period in which demand adjustment is being requested.

Figure 7:
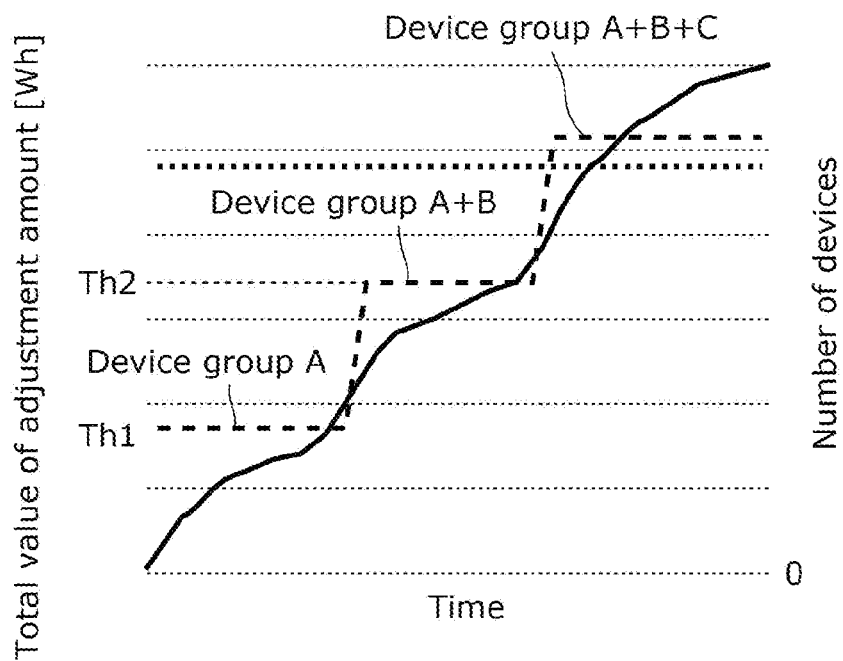
FIG. 7 is a graph illustrating an example of a result of demand adjustment control by a demand adjustment control system according to a comparative example.

FIG. 7 is a graph illustrating an example of demand adjustment control by the demand adjustment control system according to the comparative example. In FIG. 7, a vertical axis on the left side indicates the total value of an adjustment amount, a vertical axis on the right side indicates the number of devices 20 on which demand adjustment control is executed, and a horizontal axis indicates time. Moreover, in FIG. 7, a solid line represents the total value of an adjustment amount, a broken line represents the number of devices 20 on which demand adjustment control is executed, and a dotted line represents a target adjustment amount.

As illustrated in FIG. 7, the demand adjustment control system according to the comparative example first starts demand adjustment control of device group A when a period in which demand adjustment is being requested starts. Next, when the total value of the adjustment amount achieved by device group A reaches first threshold value Th1, the demand adjustment control system according to the comparative example further starts demand adjustment control of device group B. Then, when the total value of the adjustment amount achieved by device group A and device group B reaches second threshold value Th2, the demand adjustment control system according to the comparative example further starts demand adjustment control of device group C.

In the example illustrated in FIG. 7, during the period in which demand adjustment is being requested, the number of devices 20 on which demand adjustment control is executed does not change even though the total value of the adjustment amount achieved by device group A to device group C exceeds the target adjustment amount. Accordingly, the demand adjustment control system according to the comparative example has the problem that the number of devices 20 on which demand adjustment control is executed cannot be flexibly changed during a period in which demand adjustment is being requested and the total value of an adjustment amount cannot be kept close to a target adjustment amount.

Figure 8:
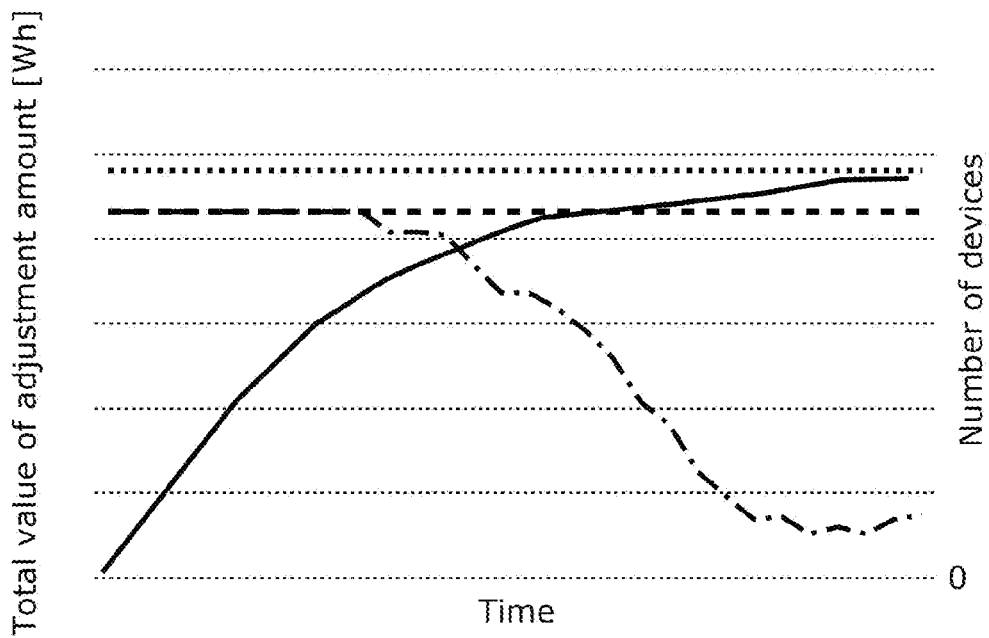
FIG. 8 is a graph illustrating an example of a result of demand adjustment control by the demand adjustment control system according to Embodiment 1.

FIG. 8 is a graph illustrating an example of demand adjustment control by demand adjustment control system 100 according to Embodiment 1. In FIG. 8, a vertical axis on the left side indicates the total value of an adjustment amount, a vertical axis on the right side indicates the number of devices 20 on which demand adjustment control is executed, and a horizontal axis indicates time. Moreover, in FIG. 8, a solid line represents the total value of an adjustment amount, a broken line represents the number of first devices 21 on which demand adjustment control is executed, a one-dot chain line represents the number of second devices 22 on which demand adjustment control is executed, and a dotted line represents a target adjustment amount.

As illustrated in FIG. 8, demand adjustment control system 100 according to Embodiment 1 starts demand adjustment control of both first devices 21 and second devices 22 when a period in which demand adjustment is being requested starts. Then, during the period in which demand adjustment is being requested, demand adjustment control system 100 according to Embodiment 1 continues the demand adjustment control of first devices 21 but appropriately changes the number of second devices 22 on which the demand adjustment control is executed.

In the example illustrated in FIG. 8, as the total value of the adjustment amount becomes closer to the target adjustment amount, demand adjustment control system 100 according to Embodiment 1 decreases the number of second devices 22 on which the demand adjustment control is executed. Therefore, in the example illustrated in FIG. 8, the total value of the adjustment amount does not exceed the target adjustment amount during the period in which demand adjustment is being requested. Accordingly, demand adjustment control system 100 according to Embodiment 1 has the advantageous effect that the total value of an adjustment amount can be easily kept close to a target adjustment amount since the number of second devices 22 on which demand adjustment control is executed can be flexibly changed and thus the adjustment amount can be flexibly adjusted during a period in which demand adjustment is being requested.

Moreover, in demand adjustment control system 100 according to Embodiment 1, target devices 3 are determined from device group 2 including first devices 21 and second devices 22, as described above. Therefore, demand adjustment control system 100 according to Embodiment 1 has relatively small influence on a user of facility 4 even when demand adjustment control mode of second devices 22 is repeatedly changed to adjust an adjustment amount during a period in which demand adjustment is being requested. Accordingly, demand adjustment control system 100 according to Embodiment 1 has the advantageous effect that the influence on facility 4 during a period in which demand adjustment is being requested can be easily reduced.

Embodiment 2

1. Configuration

Figure 9:
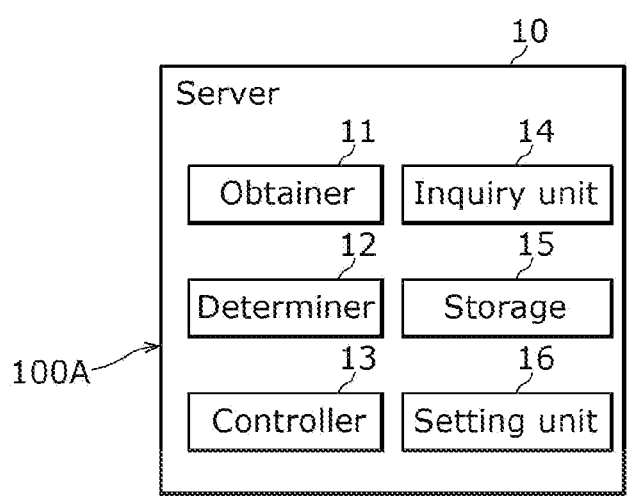
FIG. 9 is a block diagram illustrating the configuration of a demand adjustment control system according to Embodiment 2.

Hereinafter, demand adjustment control system 100A according to Embodiment 2 will be described with reference to FIG. 9. FIG. 9 is a block diagram illustrating the configuration of demand adjustment control system 100A according to Embodiment 2. Demand adjustment control system 100A according to Embodiment 2 differs from demand adjustment control system 100 according to Embodiment 1 in that demand adjustment control system 100A further includes setting unit 16 that predicts a trend of power consumption during a period in which demand adjustment is being requested and sets an intermediate target demand adjustment value based on the trend predicted. Moreover, demand adjustment control system 100A according to Embodiment 2 differs from demand adjustment control system 100 according to Embodiment 1 in that controller 13 of demand adjustment control system 100A executes demand adjustment control on target devices 3 to cause an adjustment amount per unit time (e.g., one minute) achieved by target devices 3 to satisfy the intermediate target demand adjustment value during a period in which demand adjustment is being requested.

In other words, demand adjustment control system 100A according to Embodiment 2 executes demand adjustment control on target devices 3 to cause the total value of an adjustment amount achieved by target devices 3 to fall within a range of a target adjustment amount during a period in which demand adjustment is being requested, similarly to demand adjustment control system 100 according to Embodiment 1. However, unlike demand adjustment control system 100 according to Embodiment 1, demand adjustment control system 100A according to Embodiment 2 further controls target devices 3 to cause an adjustment amount per unit time to satisfy an intermediate target demand adjustment value during the period in which demand adjustment is being requested.

Figure 10A:
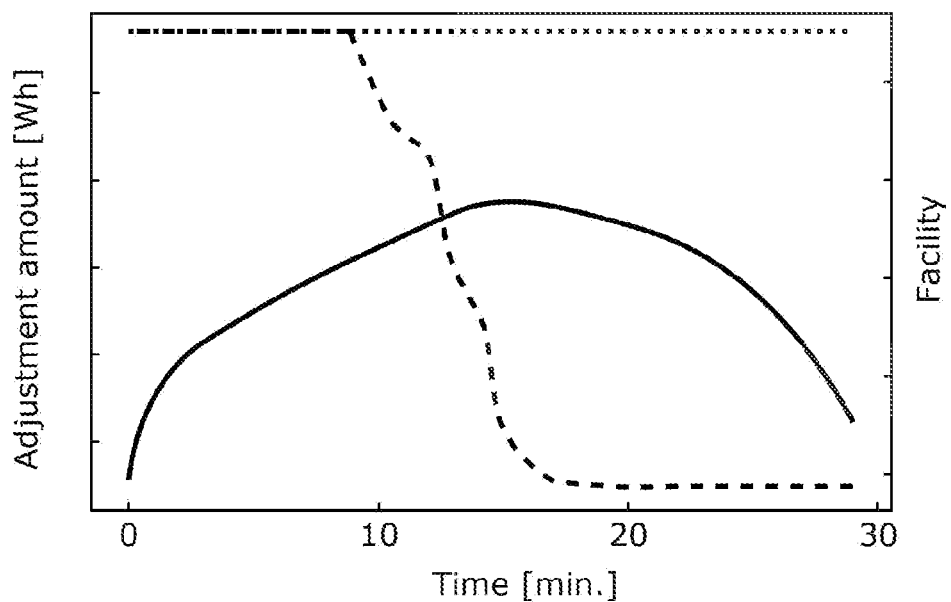
FIG. 10A illustrates a problem that may arise during demand adjustment control by the demand adjustment control system according to Embodiment 1.
Figure 10B:
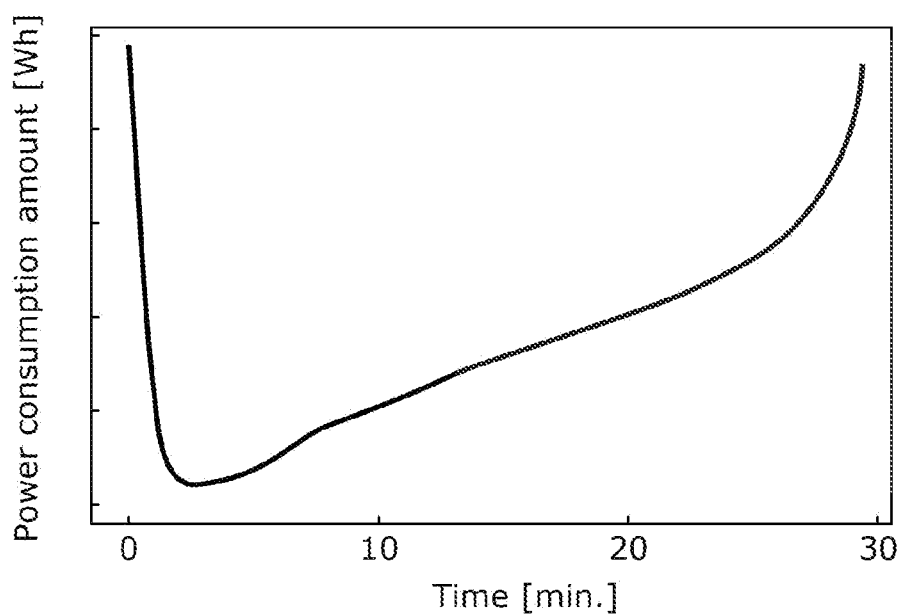
FIG. 10B illustrates a problem that may arise during demand adjustment control by the demand adjustment control system according to Embodiment 1.

In demand adjustment control system 100 according to Embodiment 1, problems as illustrated in FIG. 10A and FIG. 10B may possibly arise as described below. Each of FIG. 10A and FIG. 10B illustrates a problem that may arise during demand adjustment control by demand adjustment control system 100 according to Embodiment 1. In FIG. 10A, a vertical axis on the left side indicates an adjustment amount per unit time, a vertical axis on the right side indicates the number of facilities 4 (i.e., devices 20) on which demand adjustment control is executed, and a horizontal axis indicates time. Moreover, in FIG. 10A, a solid line represents an adjustment amount per unit time, a broken line represents the number of facilities 4 on which demand adjustment control is executed, and a dotted line represents a target adjustment amount per unit time. In FIG. 10B, a vertical axis indicates an overall power consumption amount per unit time in facilities 4 and a horizontal axis indicates time.

As illustrated in FIG. 10A, the adjustment amount per unit time increases with time during the first half of the period in which demand adjustment is being requested. Accordingly, demand adjustment control system 100 according to Embodiment 1 determines that the adjustment amount per unit time will exceed the target adjustment amount per unit time if the current demand adjustment control is maintained, and decreases, at the middle of the period in which demand adjustment is being requested, the number of facilities 4 (i.e., second devices 22) on which the demand adjustment control is executed.

However, there may be a case where the overall power consumption amount per unit time in facilities 4 temporarily increases during the period in which demand adjustment is being requested, depending on a trend of power consumption in each facility 4. For example, such a temporary increase of power consumption amount per unit time may be caused by defrosting of refrigeration equipment when facility 4 is a store that sells food. For another example, such a temporary increase of power consumption amount per unit time may be caused by a change in load of an air-conditioning apparatus due to a change in the outside temperature. When the overall power consumption amount per unit time in facilities 4 increases as described above, the adjustment amount per unit time relatively decreases.

In the example illustrated in FIG. 10B, the overall power consumption amount per unit time in facilities 4 rapidly increases during the second half of the period in which demand adjustment is being requested. In this case, as illustrated in FIG. 10A, there is the problem that the adjustment amount per unit time decreases during the second half of the period in which demand adjustment is being requested, and thus does not reach the target adjustment amount per unit time.

Then, in Embodiment 2, setting unit 16 predicts a trend of power consumption during the period in which demand adjustment is being requested. For example, setting unit 16 can predict the trend of power consumption by using a model that is trained to use, as an input, a history of the past power consumption or a history of the past outside temperature for each facility 4 and to output the trend of power consumption. Then, setting unit 16 calculates and sets an intermediate target demand adjustment value, based on the trend of power consumption predicted. For example, a trend in which power consumption is relatively low during the first half of the period in which demand adjustment is being requested but increases during the second half of the period in which demand adjustment is being requested is assumed to be predicted. In this case, setting unit 16 sets an intermediate target demand adjustment value in order for the adjustment amount per unit time to temporarily exceed the target adjustment amount per unit time, in preparation for an increase of power consumption during the second half of the period in which demand adjustment is being requested. Then, controller 13 executes the demand adjustment control on target devices 3 in order to keep the adjustment amount per unit time achieved by target devices 3 close to the intermediate target demand adjustment value during the period in which demand adjustment is being requested.

2. Advantageous Effect and so on

Figure 11:
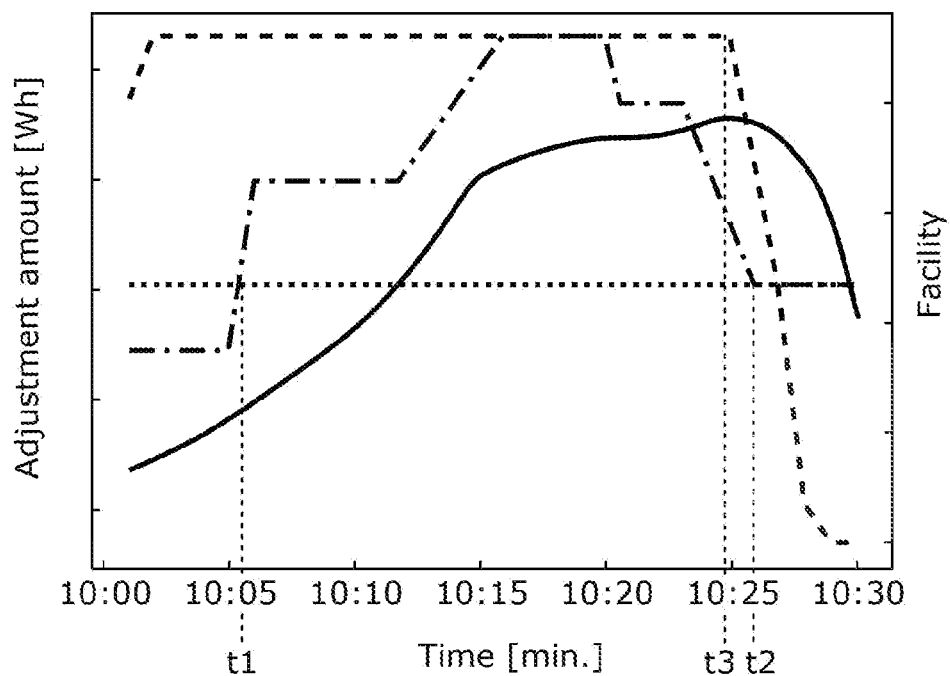
FIG. 11 is a graph illustrating an example of a result of demand adjustment control by the demand adjustment control system according to Embodiment 2.

Hereinafter, an advantageous effect of demand adjustment control system 100A according to Embodiment 2 will be described with reference to FIG. 11. FIG. 11 is a graph illustrating an example of a result of demand adjustment control by demand adjustment control system 100A according to Embodiment 2. In FIG. 11, a vertical axis on the left side indicates an adjustment amount per unit time, a vertical axis on the right side indicates the number of facilities 4 (i.e., devices 20) on which demand adjustment control is executed, and a horizontal axis indicates time. Moreover, in FIG. 11, a solid line represents an adjustment amount per unit time, a broken line represents the number of facilities 4 on which demand adjustment control is executed, a one-dot chain line represents an intermediate target demand adjustment value, and a dotted line represents a target adjustment amount per unit time.

In the example illustrated in FIG. 11, setting unit 16 predicts that the overall power consumption amount per unit time in facilities 4 will increase during the second half of the period in which demand adjustment is being requested. Accordingly, setting unit 16 sets the intermediate target demand adjustment value in order for the adjustment amount per unit time to temporarily exceed the target adjustment amount per unit time during a time period from time t1 to time t2. Therefore, in the example illustrated in FIG. 11, controller 13 does not decrease but maintain the number of facilities 4 (i.e., second devices 22) on which the demand adjustment control is executed until time t3 even though the adjustment amount per unit time exceeds the target adjustment amount per unit time.

Then, in the example illustrated in FIG. 11, the adjustment amount per unit time eventually satisfies the target adjustment amount per unit time during the period in which demand adjustment is being requested. As described above, demand adjustment control system 100A according to Embodiment 2 has the advantageous effect that a situation in which the adjustment amount per unit time does not satisfy the target adjustment amount per unit time can be easily avoided during the period in which demand adjustment is being requested.

Variation

As above, the embodiments are described as exemplifications of the technique disclosed in the present application. However, the techniques in the present disclosure are not limited to those examples; appropriate modifications, interchanges, additions, omissions, etc., to the embodiments are possible. Moreover, various elements described in the above embodiments may be combined to achieve a new embodiment.

Hereinafter, variations of the embodiments will be exemplified.

In each of the above-described embodiments, a lighting fixture is selected as first device 21. However, not all of lighting fixtures need to be selected as first devices 21 but some of the lighting fixtures may be selected as second devices 22 depending on a time zone. In other words, a device selected as first device 21 may sometimes be selected as second device 22 and a device selected as second device 22 may sometimes be selected as first device 21, depending on a condition.

Figure 12:
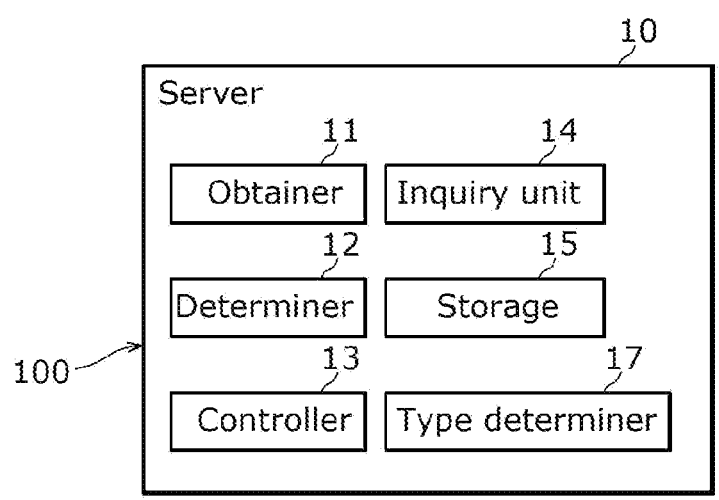
FIG. 12 is a block diagram illustrating the configuration of a demand adjustment control system according to a variation of Embodiment 1.

Therefore, in Embodiment 1 for example, demand adjustment control system 100 may further include type determiner 17 that determines which of devices 20 in device group 2 are to be selected as one or more first devices 21 and which of devices 20 in device group 2 are to be selected as one or more second devices 22, as illustrated in FIG. 12. FIG. 12 is a block diagram illustrating the configuration of demand adjustment control system 100 according to a variation of Embodiment 1. For example, type determiner 17 determines which of devices 20 in device group 2 are to be selected as one or more first devices 21 and which of devices 20 in device group 2 are to be selected as one or more second devices 22, depending on the season, time zone, or the like. Specifically, when facility 4 is a convenience store or the like including a kitchen, for example, type determiner 17 may select a fryer provided in the kitchen as second device 22 only in summer and select the fryer as first device 21 in other seasons.

For another example, type determiner 17 may determine which of devices 20 in device group 2 are to be selected as one or more first devices 21 and which of devices 20 in device group 2 are to be selected as one or more second devices 22, based on a record of the past demand adjustment control. It should be noted that demand adjustment control system 100A according to Embodiment 2 may also include type determiner 17.

In each of the above-described embodiments, when one or more second devices 22 are selected as one or more target devices 3, controller 13 executes demand adjustment control on one or more second devices 22 regardless of facility 4; however, the present disclosure is not limited to this example. For example, when one or more second devices 22 are selected as one or more target devices 3, controller 13 may execute demand adjustment control on one or more second devices 22 under a condition that is in accordance with facility 4 in which one or more second devices 22 are provided. For example, controller 13 may change the detail of demand adjustment control of one or more second devices 22, according to an area in which facility 4 is located.

Specifically, in a case where demand adjustment control is executed on an air-conditioning apparatus selected as second device 22 in winter, controller 13 executes demand adjustment control of decreasing the set temperature of the air-conditioning apparatus more than usual when facility 4 in which second device 22 is provided is located in a cold region. On the other hand, controller 13 executes demand adjustment control of stopping the operation of the air-conditioning apparatus when facility 4 in which second device 22 is provided is not located in a cold region.

In each of the above-described embodiments, when second devices 22 are selected as target devices 3, controller 13 may execute demand adjustment control on second devices 22 one by one. For example, three second devices 22, specifically, "A", "B", and "C" are assumed to be selected as target devices 3. In this case, controller 13 executes demand adjustment control firstly on "A", secondly on "B", and finally on "C". Thus, controller 13 controls second devices 22 such that demand adjustment control is not simultaneously executed on second devices 22. In this aspect, there is the advantageous effect that the influence on facility 4 can be easily reduced compared to a case where demand adjustment control is simultaneously executed on second devices 22.

In each of the above-described embodiments, determiner 12 determines which of one or more second devices 22 are to be selected as one or more target devices 3, based on a record of the past demand adjustment control; however, the present disclosure is not limited to this example. For example, determiner 12 may randomly determine which of one or more second devices 22 are to be selected as one or more target devices 3, from among second devices 22 that are possible to participate in the demand adjustment control. Specifically, determiner 12 assigns consecutive numbers to second devices 22 and then selects, as target device 3, second device 22 with the number identical to a pseudorandom number generated by an appropriate pseudo-random number algorithm.

Moreover, although each of demand adjustment control systems 100 and 100A is implemented as a single device in the above-described embodiments for example, each of them may be implemented by a plurality of devices. When each of demand adjustment control systems 100 and 100A is implemented by a plurality of devices, the constituent elements included in each of demand adjustment control systems 100 and 100A can be assigned to any of the plurality of devices. For example, although server 10 includes all of the constituent elements included in each of demand adjustment control systems 100 and 100A in the above-described embodiments, server 10 may only include some of the constituent elements included in each of demand adjustment control systems 100 and 100A. In other words, the present disclosure may be implemented by cloud computing or edge computing.

Moreover, for example, in the above-described embodiments, part or all of the constituent elements of each of demand adjustment control systems 100 and 100A in the present disclosure may be configured by a dedicated hardware or may be implemented by executing a software program suitable for each of the constituent elements. Each of the constituent elements may be implemented by a program execution unit, such as a central processing unit (CPU) or a processor, to retrieve and execute a software program stored in a recording medium such as a hard disk drive (HDD) or a semiconductor memory.

Furthermore, the constituent elements of each of demand adjustment control systems 100 and 100A in the present disclosure may be configured by one or more electronic circuits. Each of the one or more electronic circuits may be a general circuit or a dedicated circuit.

The one or more electronic circuits may include a semiconductor device, an integrated circuit (IC), or a large scale integration (LSI), for example. The IC or the LSI may be integrated on a single chip or a combination of a plurality of chips. Here, the one or more electronic circuits are referred to as an IC or an LSI, but may also be referred to as a system LSI, a very large scale integration (VLSI), or an ultra large scale integration (ULSI), depending on the scale of integration. Furthermore, a field programmable gate array (FPGA) that is programmed after an LSI is manufactured may also be used for the same purpose.

Furthermore, general or specific aspects of the present disclosure may be realized as a system, a device, a method, an integrated circuit, or a computer program. Alternatively, general or specific aspects of the present disclosure may be realized as a non-transitory computer-readable recording medium, such as an optical disk, an HDD, or a semiconductor memory device, in which the computer program is stored. For example, the present disclosure may be realized as a program for causing a computer to execute a demand adjustment control method according to the above-described embodiments. Furthermore, the program may be stored in a non-transitory computer-readable recording medium such as a CD-ROM, or may be distributed via a communication path such as the Internet.

As above, the embodiments are described as exemplifications of the technique disclosed in the present disclosure. To this extent, the accompanying drawings and detailed description are provided.

Accordingly, the constituent elements described in the accompanying drawings and the detailed description may include, not only constituent elements essential to solving the problem, but also constituent elements that are not essential to solving the problem in order to exemplify the aforementioned technique. Those unnecessary constituent elements should not be deemed essential due to the mere fact that they are described in the accompanying drawings and the detailed description.

Moreover, each of the above-described embodiments shows examples of techniques according to the present disclosure. Thus, various modifications, replacements, additions, omissions, or the like can be made within the scope of the claims or in a scope equivalent to the scope of the claims.

CONCLUSION

As described above, each of demand adjustment control systems 100 and 100A according to the embodiments includes obtainer 11, determiner 12, and controller 13. Obtainer 11 obtains a target adjustment amount according to a temporary demand adjustment request. Determiner 12 determines one or more target devices 3 each of which is to be a target of demand adjustment control from device group 2 that is provided in facility 4, based on the target adjustment amount obtained by obtainer 11. Controller 13 executes the demand adjustment control on one or more target devices 3 to cause an adjustment amount achieved by one or more target devices 3 to fall within a range of the target adjustment amount during a period in which demand adjustment is being requested. Device group 2 includes one or more first devices 21 of which demand adjustment control mode is not changed during the period and one or more second devices 22 of which demand adjustment control mode can be changed during the period.

Accordingly, each of demand adjustment control systems 100 and 100A has the advantageous effect that the influence on facility 4 during the period in which demand adjustment is being requested can be easily reduced since the influence on a user of facility 4 is relatively small even when the demand adjustment control mode of one or more second devices 22 is repeatedly changed to adjust the adjustment amount during the period in which demand adjustment is being requested.

Moreover, for example, determiner 12 determines which of one or more second devices 22 are to be selected as one or more target devices 3, based on a record of the past demand adjustment control.

Accordingly, each of demand adjustment control systems 100 and 100A has the advantageous effect that the adjustment amount can be easily adjusted since second device 22 that is likely to achieve a sufficient adjustment amount can be selected as target device 3 during the period in which demand adjustment is being requested.

Furthermore, for example, each of demand adjustment control systems 100 and 100A further includes inquiry unit 14 that makes an inquiry to facility 4 about whether facility 4 will participate in the demand adjustment control. Determiner 12 determines one or more target devices 3 according to a reply to the inquiry made by inquiry unit 14.

Accordingly, each of demand adjustment control systems 100 and 100A has the advantageous effect that the influence on facility 4 can be easily reduced since the demand adjustment control can be executed only on one or more devices 20 in facility 4 that is possible to participate in the demand adjustment control during the period in which demand adjustment is being requested.

Furthermore, demand adjustment control system 100A further includes setting unit 16 that predicts a trend of power consumption during the period and sets an intermediate target demand adjustment value based on the trend predicted. Controller 13 executes the demand adjustment control on one or more target devices 3 in order to cause an adjustment amount per unit time achieved by one or more target devices 3 to satisfy the intermediate target demand adjustment value during the period.

Accordingly, demand adjustment control system 100A has the advantageous effect that a situation in which the adjustment amount per unit time does not satisfy a target adjustment amount per unit time can be easily avoided during the period in which demand adjustment is being requested.

Furthermore, for example, each of demand adjustment control systems 100 and 100A further includes type determiner 17 that determines which of devices 20 in device group 2 are to be selected as one or more first devices 21 and which of devices 20 included in device group 2 are to be selected as one or more second devices 22.

Accordingly, each of demand adjustment control systems 100 and 100A has the advantageous effect that the demand adjustment control can be flexibly executed during the period in which demand adjustment is being requested by, for example, selecting device 20, which is normally selected as first device 21, as second device 22.

Furthermore, for example, when one or more second devices 22 are selected as one or more target devices 3, controller 13 executes the demand adjustment control on one or more second devices 22 under a condition that is in accordance with facility 4 in which one or more second devices 22 are provided.

Accordingly, each of demand adjustment control systems 100 and 100A has the advantageous effect that the influence on facility 4 can be easily reduced since demand adjustment control that is appropriate to the situation in each facility 4 can be executed.

Furthermore, for example, when second devices 22 are selected as target devices 3, controller 13 executes the demand adjustment control on second devices 22 one by one.

Accordingly, each of demand adjustment control systems 100 and 100A has the advantageous effect that the influence on facility 4 can be easily reduced compared to a case where the demand adjustment control is simultaneously executed on second devices 22.

Furthermore, for example, a demand adjustment control method according to the embodiments includes obtaining ST1, determining ST2, and controlling ST3. In obtaining ST1, a target adjustment amount according to a temporary demand adjustment request is obtained. In determining ST2, one or more target devices 3 each of which is to be a target of demand adjustment control are determined from device group 2 that is provided in facility 4, based on the target adjustment amount obtained in obtaining ST1. In controlling ST3, the demand adjustment control is executed on one or more target devices 3 to cause an adjustment amount achieved by one or more target devices 3 to fall within a range of the target adjustment amount during a period in which demand adjustment is being requested. Device group 2 includes one or more first devices 21 of which demand adjustment control mode is not changed during the period and one or more second devices 22 of which demand adjustment control mode can be changed during the period.

Accordingly, the demand adjustment control method has the advantageous effect that the influence on facility 4 during the period in which demand adjustment is being requested can be easily reduced since the influence on a user of facility 4 is relatively small even when the demand adjustment control mode of one or more second devices 22 is repeatedly changed to adjust the adjustment amount during the period in which demand adjustment is being requested.

Furthermore, for example, a recording medium according to the embodiments is a non-transitory computer-readable recording medium that has recorded thereon a program for causing a processor to execute the above-described demand adjustment control method.

Accordingly, the program has the advantageous effect that the influence on facility 4 during the period in which demand adjustment is being requested can be easily reduced since the influence on a user of facility 4 is relatively small even when the demand adjustment control mode of one or more second devices 22 is repeatedly changed to adjust the adjustment amount during the period in which demand adjustment is being requested.

INDUSTRIAL APPLICABILITY

The present disclosure is applicable to a demand adjustment control system and so on that execute demand adjustment control on a plurality of devices included in a plurality of facilities such as a convenience store and the like, for example.

The invention claimed is:

1. A demand adjustment control system comprising:
one or more memories; and
at least one processor coupled to at least one of the one or more memories and configured to perform operations comprising:
obtaining a target adjustment amount according to a temporary demand adjustment request;
determining one or more target devices each of which is to be a target of demand adjustment control from a device group that is provided in a facility, based on the target adjustment amount, the device group being a group of one or more candidates for the one or more target devices; and
executing the demand adjustment control on the one or more target devices to cause an adjustment amount achieved by the one or more target devices to fall within a range of the target adjustment amount during a period in which demand adjustment is being requested by the temporary demand adjustment request,
wherein the device group includes one or more first devices of which demand adjustment control mode is not changed during the period and one or more second devices of which demand adjustment control mode can be changed during the period,
in the determining, the one or more second devices, as the one or more target devices, are determined to be selected as the one or more target devices, based on a record of past demand adjustment control, and
the executing comprises executing the demand adjustment control on the one or more first devices determined as the one or more target devices in the demand adjustment control mode that is not changed during the period, and executing the demand adjustment control on the one or more second devices determined as the one or more target devices in the demand adjustment control mode that can be changed during the period.

2. The demand adjustment control system according to claim 1, wherein the operations further comprise:
making an inquiry to the facility about whether the facility will participate in the demand adjustment control,
wherein the determining comprises determining the one or more target devices according to a reply to the inquiry.

3. The demand adjustment control system according to claim 1, wherein the operations further comprise:
predicting a trend of power consumption during the period and sets setting an intermediate target demand adjustment value based on the trend predicted, wherein the executing comprises executing the demand adjustment control on the one or more target devices to cause an adjustment amount per unit time achieved by the one or more target devices to satisfy the intermediate target demand adjustment value during the period.

4. The demand adjustment control system according to claim 1, wherein the operations further comprise:
determining which of devices in the device group are to be selected as the one or more first devices and which of the devices in the device group are to be selected as the one or more second devices.

5. The demand adjustment control system according to claim 1,
wherein, when the one or more second devices are selected as the one or more target devices, the executing further comprises executing the demand adjustment control on the one or more second devices under a condition that is in accordance with the facility in which the one or more second devices are provided.

6. The demand adjustment control system according to claim 1,
wherein, when a plurality of second devices are selected as the one or more target devices, the executing further comprises executing the demand adjustment control on the plurality of second devices one by one.

7. A demand adjustment control method comprising:
obtaining a target adjustment amount according to a temporary demand adjustment request;
determining one or more target devices each of which is to be a target of demand adjustment control from a device group that is provided in a facility, based on the target adjustment amount, the device group being a group of one or more candidates for the one or more target devices; and
executing the demand adjustment control on the one or more target devices to cause an adjustment amount achieved by the one or more target devices to fall within a range of the target adjustment amount during a period in which demand adjustment is being requested by the temporary demand adjustment request,
wherein the device group includes one or more first devices of which demand adjustment control mode is not changed during the period and one or more second devices of which demand adjustment control mode can be changed during the period,
the one or more second devices, as the one or more target devices, are determined to be selected as the one or more target devices, based on a record of past demand adjustment control, and
the executing comprises executing the demand adjustment control on the one or more first devices determined as the one or more target devices in the demand adjustment control mode that is not changed during the period, and executing the demand adjustment control on the one or more second devices determined as the one or more target devices in the demand adjustment control mode that can be changed during the period.

8. A non-transitory computer-readable recording medium having recorded thereon a program for causing a processor to execute the demand adjustment control method according to claim 7.

* * * * *